Jan. 23, 1968  W. V. CHILDS ETAL  3,365,276
PROCESS FOR PRODUCING HYDROGEN FROM DISSOCIATION
OF A HYDROGEN HALIDE
Filed Feb. 17, 1964
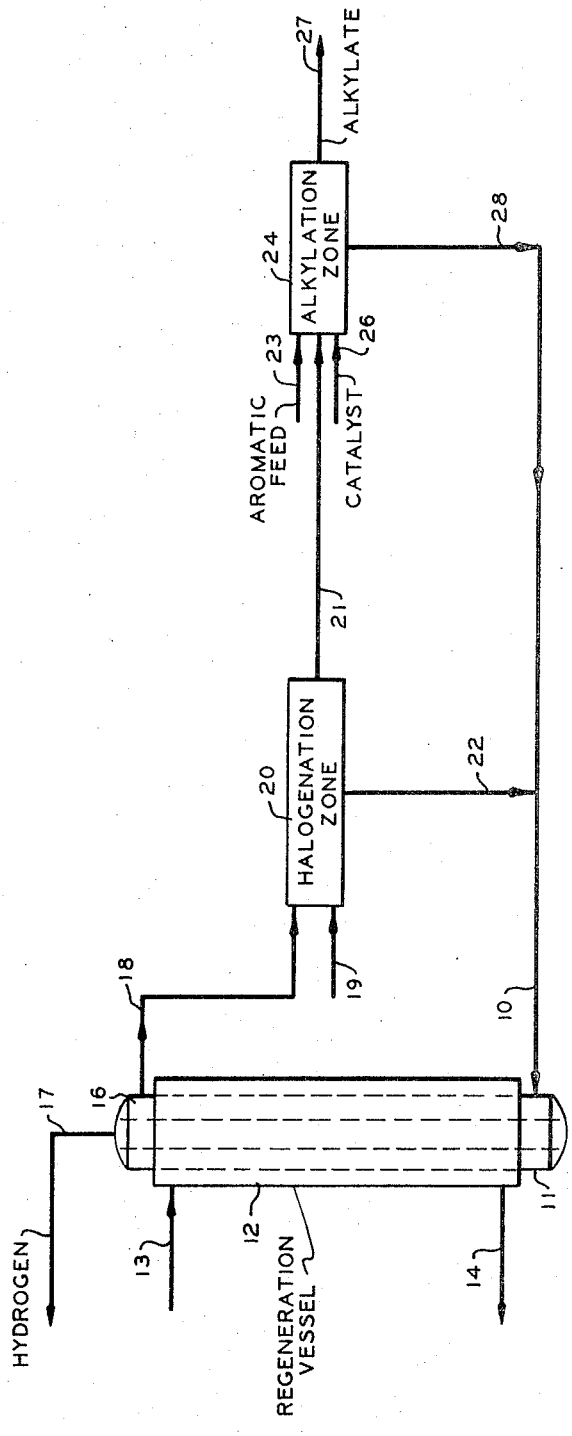
INVENTORS
W.V. CHILDS
H.M. FOX
BY
Young & Quigg
ATTORNEYS

United States Patent Office 3,365,276
Patented Jan. 23, 1968

3,365,276
PROCESS FOR PRODUCING HYDROGEN FROM DISSOCIATION OF A HYDROGEN HALIDE
William V. Childs and Homer M. Fox, Bartlesville, Okla., assignors to Phillips Petroleum Company, a corporation of Delaware
Filed Feb. 17, 1964, Ser. No. 345,392
8 Claims. (Cl. 23—212)

ABSTRACT OF THE DISCLOSURE

A hydrogen halide is heated to its dissociation temperature in the presence of a hydrogen-permeable metal or alloy, and the resulting hydrogen passed through this hydrogen-permeable membrane. A catalyst may be present to aid in the dissociation; also a pressure differential can be maintained across the membrane. This separation process can be used in such systems as those employing a halogen to halogenate a hydrocarbon for use in a subsequent alkylation reaction; hydrogen halide recovered from the halogenation zone can be dissociated, the hydrogen and halogen separated, and the halogen returned to the halogenation zone.

---

This invention relates to a process and apparatus for the conversion of hydrogen halides to free halogens and hydrogen. In another aspect, this invention relates to a hydrocarbon halogenation process wherein the hydrogen halide recovered from the halogenation zone is converted to free halogen and hydrogen by a novel process. In another aspect, this invention relates to an alkylation process wherein the hydrogen halide recovered from the halogenation and alkylation zones is converted to free halogen and hydrogen by a novel process.

In the halogenation of paraffinic hydrocarbons, a halogen and a paraffinic hydrocarbon are introduced into a halogenation zone and a product comprising hydrogen halide and halogenated hydrocarbon withdrawn from the halogenation zone. The economic feasibility of the halogenation process would be substantially increased if an efficient process for the recovery of halogen from the hydrogen halide were provided, enabling the recovered halogen to be recycled to the halogenation zone.

In the alkylation process wherein, for example, benzene is alkylated in the presence of an aluminum chloride catalyst, a chlorinated paraffinic hydrocarbon and benzene are introduced into the alkylation zone and a product effluent comprising alkylate and hydrogen chloride is withdrawn from the alkylation zone. As in the case of the halogenation process, the economic feasibility of the alkylation process would be substantially increased if an efficient process for the recovery of halogen from the hydrogen halide withdrawn from the alkylation zone were provided, enabling the recovered halogen to be employed in the halogenation of paraffinic hydrocarbons to be employed in the alkylation process.

Accordingly, an object of our invention is to provide a process and apparatus for the conversion of hydrogen halide to hydrogen and free halogen.

Another object of our invention is to provide an improved hydrocarbon halogenation process wherein the hydrogen halide recovered from the halogenation zone is converted to free halogen and hydrogen.

Another object of our invention is to provide an improved alkylation process wherein the hydrogen halide recovered from the alkylation zone is converted to free halogen and hydrogen.

Other objects, advantages and features of our invention will be readily apparent to those skilled in the art from the following description, the drawing and the appended claims.

Broadly, our invention comprises heating a hydrogen halide to at least the dissociation temperature of the said hydrogen halide, and preferably heating said hydrogen halide to a temperature whereat substantial dissociation of the said hydrogen halide is effected, said heating conducted in the presence of a hydrogen-permeable metal or alloy, passing the hydrogen from the equilibrium mixture existing under those conditions through the hydrogen-permeable wall into a zone of lower hydrogen pressure, thereby driving the hydrogen halide dissociation. The products of the hydrogen halide dissociation or regeneration process are pure hydrogen and a hydrogen halide stream enriched with free halogen which can be utilized in halogenation processes, to include alkylation processes, and the like.

The hydrogen halides which are applicable for this regenerative or conversion process are hydrogen iodide, hydrogen bromide, hydrogen chloride, and hydrogen fluoride, preferably hydrogen iodide, hydrogen bromide, and hydrogen chloride. Any material can be employed as the selective barrier which will permit hydrogen to diffuse through the barrier to the exclusion of other gases. Examples of suitable selective materials are platinum, iron, palladium, nickel, molybdenum, copper, aluminum, and niobium. Alloys of these metals are frequently preferred and examples of suitable alloys include niobium-palladium and silver-palladium. Organic materials such as those comprising polymeric films of polystyrene and ethylcellulose are also known to selectively diffuse hydrogen. However, those more durable materials, such as the noble metals and their alloys, are preferred in the operation of our invention.

The hydrogen halide is heated to at least the dissociation temperature of the hydrogen halide in the presence of a hydrogen-permeable membrane. A passage of the dissociated hydrogen through the hydrogen-permeable membrane is effected by maintaining a pressure differential across the hydrogen-permeable material, maintaining the highest pressure in the heating or dissociation zone. The vaporous hydrogen halide fed to the dissociation or heating zone can be associated with a means for compressing the vapors and the hydrogen gas on the other side of the diffusion or hydrogen-permeable wall can be associated with a conventional means for pressure reduction.

The conditions under which the dissociation and diffusion process can operate can vary over a wide range. In general, however, increasing the temperature and pressure in the dissociation zone enhance the hydrogen halide conversion process. Although the conversion of hydrogen iodide, for example, can be carried out, if desired, at temperatures as low as room temperature, it is preferred to operate the process at the highest temperature which is practical and convenient considering the construction materials employed in the hydrogen halide conversion zone. Highest diffusion rates are obtained above 600° F. As previously noted, it is preferred to operate at the highest pressure that the specific hydrogen halide apparatus employed can tolerate. To increase the pressure differential across the hydrogen selectively permeable membrane, it is frequently convenient to maintain a less than atmospheric pressure on the hydrogen side of the membrane as well as a superatmospheric pressure on the hydrogen halide feed side.

It is within the scope of this invention to employ a catalyst in the heating and dissociation zone to promote and rapidly establish the dissociation equilibrium level. For example, the hydrogen-permeable membrane can be coated with a thin film of catalytic material on the dissociation side of the membrane. Suitable dissociation catalytic materials include platinum black and the noble metals of the platinum and palladium subgroups of Group VIII of the Periodic Table (ruthenium, rhodium, palladium, osmium, irridium, platinum). These catalytic materials can be applied to the hydrogen-permeable membrane by conventional methods, such as electrolysis, to leave a thin film of high surface material.

As an example of the process, satisfactory operation has been achieved at temperatures of about 800° F. with about 80 p.s.i.g. on the hydrogen halide feed side of a silver-palladium membrane and an absolute pressure of less than 1 mm. on the hydrogen side. An advantage of high temperature operation in the conversion of the hydrogen halide is that hydrogen halide corrosion of the membrane material is minimized due to the instability of the products of this chemical attack at high temperatures.

The drawing is a schematic representation of one embodiment of the inventive process and apparatus therefor.

Referring to the drawing, a vaporous or liquid hydrogen halide feed is passed via conduit means 10 to a regeneration vessel 11. Although not herein illustrated, it is within the scope of this invention to preheat the hydrogen halide feed passed to regeneration vessel 11. As illustrated, regeneration vessel 11 is surrounded by a jacket 12. A heating medium, such as furnace flue gases, is passed via conduit means 13 to jacket 12 and is withdrawn from jacket 12 via conduit means 14. A heating medium is employed to indirectly heat the hydrogen halide feed to at least the dissociation temperature of the hydrogen halide. It is within the scope of this invention to employ other means, such as electrical means, of heating regeneration vessel 11.

Positioned within regeneration vessel 11 is a hydrogen-permeable membrane 16. As illustrated in the drawing, the hydrogen-permeable membrane 16 is in the form of a hollow cylinder and enclosing an inner zone, with the top and bottom of the membrane communicating with the top and bottom of regeneration vessel 11, respectively. The conduit means 17 communicates with the inner zone of lower pressure defined by the hydrogen-permeable membrane 16. In place of a single large cylinder, the hydrogen-permeable membrane can also be in the form of a bundle of relatively small diameter tubes which are clustered, each of the said small diameter tubes in communication with a common manifold.

Within regeneration vessel 11, the hydrogen halide feed is heated to at least the dissociation temperature and the resulting product hydrogen is passed through the hydrogen-permeable membrane 16 and withdrawn from regeneration vessel 11 via conduit means 17. Normally, dissociation of the hydrogen halide feed is conducted at a temperature such that complete dissociation of the hydrogen halide feed is not obtained. Therefore, the effluent stream withdrawn from regeneration vessel 11 via conduit means 18 normally comprises hydrogen halide and free halogen.

As previously noted, it is within the scope of this invention to employ a dissociation catalyst within regeneration vessel 11 and to apply the catalytic material, if desired, as a thin film upon the surface of the hydrogen-permeable membrane in contact with the hydrogen halide feed. It is, of course, within the scope of this invention to employ other membrane shapes than herein illustrated.

Due to the nature of the hydrogen halides converted by the process of this invention, the apparatus associated with the hydrogen halide conversion process must be sufficiently resistant to erosion. Construction materials which are resistant to hydrogen halide are well known in the art and such materials as stainless steel, Monel, quartz and inert high-temperature refractories can be employed in the construction of regeneration vessel 11.

In addition thereto, care must be taken to exclude materials which act as poisons for the particular hydrogen-permeable membrane employed. For example, such materials as sulfur compounds or unsaturated hydrocarbons should be avoided in regeneration vessels or systems using silver-palladium membranes, as these drastically reduce hydrogen permeability. However, substances such as nitrogen, carbon monoxide, carbon dioxide, water, ammonia and methane are tolerable. The effect of poisons on the hydrogen-permeable membrane is generally temporary, as an air treatment of the membrane at about 800° F. is normally sufficient to restore original activity. Preferably, the hydrogen-permeable membrane is subjected to air treatment prior to the start-up of the process and intermittent intervals thereafter.

By our invention we provide a hydrogen halide regeneration process wherein a stream of high purity, high value hydrogen is produced as a by-product. Moreover, the free halogen-containing stream produced by the process of our invention is free of contaminants such as water, solvent, catalyst and the like, which are utilized and found in prior art regeneration techniques.

In the halogenation of hydrocarbon, a hydrocarbon feed is passed via conduit means 19 to a halogenation zone 20. Therein the hydrocarbon feed is contacted with the halogen-containing stream passed via conduit means 18 to halogenation zone 20. A halogenated hydrocarbon-containing stream is withdrawn from halogenation zone 20 via conduit means 21. A hydrogen halide stream is withdrawn from halogenation zone 20 via conduit means 22 and recycled via conduit means 10 to regeneration vessel 11.

A typical and suitable hydrocarbon halogenation process comprises, for example, passing a dodecane feed via conduit means 19 into a quartz plug-flow reactor suitable for ultraviolet light catalyzation. Therein the dodecane is contacted with a chlorine-containing stream of gases such that the proportions of chlorine and dodecane result is about a 20 percent by weight of conversion of the hydrocarbon with a complete conversion of the halogen. The wave length of the ultraviolet light employed in the halogenation process can be in the range of 3200 to 4000 angstrom units. The residence time of the chlorine-containing stream and dodecane feed streams within the ultraviolet zone can be in the range of 8 to 20 seconds with the temperature of the halogenation zone maintained in the range of 0 to 100° F., preferably 20 to 50° F. The pressure of the halogenation zone can be maintained in the range of 20 to 100 p.s.i., preferably 30 to 50 p.s.i. The halogenation reaction conditions are normally adjusted to maintain a ratio of monochlorides to dichlorides within the range of 4:1 to 30:1, preferably 7:1 to 12:1. In addition to the typical photochemical chlorination process described above, the dodecane or other hydrocarbons can be halogenated employing conventional thermal and catalytic processes.

In the alkylation of an aromatic hydrocarbon, an aromatic feed is passed via conduit means 23 to an alkylation zone 24. An alkylation catalyst, such as an aluminum halide catalyst, is passed via conduit means 26 to alkylation zone 24. A halogenated hydrocarbon-containing stream is passed via conduit means 21 to alkylation zone 24. An alkylate-containing stream is withdrawn from alkylation zone 24 via conduit means 27. A hydrogen halide is withdrawn from alkylation zone 24 via conduit means 28 and recycled via conduit means 10 to regeneration vessel 11. Although not to be limited thereto, the invention will be described as it is applied to a specific alkylation process.

A chlorinated dodecane stream containing unconverted dodecane is passed via conduit means 21 into an agitated alkylation reactor vessel wherein it is contacted with about 20 mols of benzene passed via conduit means 23 to the reactor vessel for each mol of dodecyl chloride. Contact is effected in the presence of 1 volume of catalyst (a complex of a aluminum chloride and hydrocarbon material containing about 40—60 weight percent aluminum chloride) for each volume of the hydrocarbon feed.

The catalyst will normally contain about 4 weight percent of hydrogen chloride as a promoter.

After about a 15-minute residence time at 70° F. and 50 p.s.i.g., the reaction mixture is passed to a settling vessel and permitted to settle into two separate phases. The catalyst complex is withdrawn from the bottom of the settling vessel. The separated hydrocarbon phase is subjected to stripping whereby the by-product hydrogen chloride is liberated and withdrawn from alkylation zone 24 via conduit means 28 in the previously described manner.

The acid-free hydrocarbon phase is fractionated with the unreacted benzene recovered and recycled to the alkylation vessel. The unconverted dodecane is recycled to the chlorination stage and the light alkylate separated from the heavy alkylate. The yield of light alkylate product (dodecyl benzene) is about 90 weight percent based on the weight of the alkyl chlorides. The yield of heavy alkylate is about 10 weight percent.

The following examples are presented to illustrate the objects and advantages of the hydrogen halide conversion process of our invention.

*Example I*

In this example, hydrogen bromide was converted to hydrogen and bromine employing a silver palladium diffusion tube. The silver-palladium diffusion tube containing about 25 weight percent silver was 12 inches in length, had a wall thickness of 0.003 inch, and an outer diameter of 0.063 inch. The diffusion tube, which was sealed at one end, was inserted into a larger 9/16-inch diameter stainless steel tube. Hydrogen bromide was pressured into this outer steel tube at pressures ranging from 80 to about 200 p.s.i.g. A temperature of about 700° F. was maintained by heating the assembly in a tube furnace.

In a run which lasted 20 to 30 minutes at the above-described conditions, hydrogen was found to be generated and isolated on the low pressure side of the silver-palladium membrane. The initial pressure on this side was $10^{-2}$ millimeters mercury. As the run progressed, this pressure was found to increase and the gas in this zone was identified as hydrogen.

*Example II*

In this example, hydrogen chloride was converted to hydrogen and chlorine employing the apparatus of Example I. In an 11,000-second run at a temperature of 830 to 850° F. and 81 p.s.i.g. on the high pressure side with less than 1 millimeter of mercury pressure upon the low pressure side, hydrogen was observed to diffuse through the membrane and to increase the pressure in the low pressure zone. A test of the gas on the high pressure side of the membrane, employing potassium-iodide starch, indicated the presence of free chlorine.

As will be evident to those skilled in the art, various modifications of this invention can be made, or followed, in the light of the foregoing disclosure without departing from the spirit or scope thereof.

We claim:

1. A process for producing hydrogen which comprises heating a hydrogen halide to a temperature above 600° F. in a first zone in the presence of a hydrogen-permeable membrane, effecting dissociation of said hydrogen halide into hydrogen and halogen, maintaining a pressure differential across said hydrogen-permeable membrane and passing said hydrogen through said hydrogen-permeable membrane to a second zone maintained at a pressure below that of said first zone.

2. A process according to claim 1 wherein said hydrogen permeable membrane is composed of silver-palladium.

3. A process for producing hydrogen which comprises heating a hydrogen bromide in a first zone maintained at a temperature above 600° F. and a pressure above atmospheric in the presence of a hydrogen-permeable silver-palladium membrane, effecting dissociation of said hydrogen bromide into hydrogen and bromine and passing said hydrogen through said hydrogen-permeable membrane to a second zone maintained at a pressure below atmospheric.

4. A process for producing hydrogen which comprises heating a hydrogen chloride in a first zone maintained at a temperature above 600° F. and a pressure above atmospheric in the presence of a hydrogen-permeable silver-palladium membrane, effecting dissociation of said hydrogen chloride into hydrogen and chlorine, and passing said hydrogen through said hydrogen-permeable membrane to a second zone maintained at a pressure below atmospheric.

5. A process which comprises passing a hydrocarbon to a halogenation zone, passing a hydrogen halide and halogen mixture from a halogen regeneration zone to said halogenation zone, maintaining halogenation conditions within said halogenation zone, withdrawing a halogenated hydrocarbon from said halogenation zone, passing a hydrogen halide stream from said halogenation zone to said halogen regeneration zone, heating said hydrogen halide in said halogen regeneration zone to at least the dissociation temperature of said hydrogen halide in the presence of a hydrogen-permeable membrane, passing hydrogen through said hydrogen-permeable membrane, and withdrawing hydrogen from said halogen regeneration zone.

6. The process of claim 5 wherein said hydrocarbon passed to said halogenation zone is dodecane, said hydrogen halide and halogen mixture comprises hydrogen chloride and chlorine, and said hydrogen halide stream comprises a hydrogen chloride stream.

7. A process which comprises passing a hydrocarbon to a halogenation zone, passing a hydrogen halide and halogen mixture from a halogen regeneration zone to said halogenation zone, maintaining halogenation conditions within said halogenation zone, passing a halogenated hydrocarbon from said halogenation zone to an alkylation zone, passing an aromatic hydrocarbon to said alkylation zone, introducing an alkylation catalyst into said alkylation zone, maintaining alkylation conditions within said alkylation zone, withdrawing an alkylate stream from said alkylation zone, passing a hydrogen halide stream from said halogenation zone and said alkylation zone to said halogen regeneration zone, heating said hydrogen halide in said halogen regeneration zone in the presence of a hydrogen-permeable membrane to at least the dissociation temperature of said hydrogen halide, passing hydrogen through said hydrogen-permeable membrane, and withdrawing said hydrogen from said halogen regeneration zone.

8. The process of claim 7 wherein said hydrocarbon is dodecane, said hydrogen halide and halogen mixture comprises hydrogen chloride and chlorine, said aromatic hydrocarbon comprises benzene, and said hydrogen halide passed from said halogenation and alkylation zone to said halogen regeneration zone comprises hydrogen chloride.

References Cited

UNITED STATES PATENTS

| | | | |
|---|---|---|---|
| 3,198,604 | 8/1965 | Pfefferle | 23—212 |
| 3,251,652 | 5/1966 | Pfefferle | 23—212 X |
| 3,254,956 | 6/1966 | Hunter | 23—212 |

OTHER REFERENCES

J. W. Mellor's "A Comprehensive Treatise on Inorganic and Theoretical Chemistry," vol. 2, 1922, pp. 200 and 201. Longmans, Green and Co., New York, publishers.

MILTON WEISSMAN, *Primary Examiner.*

EDWARD STERN, OSCAR R. VERTIZ, *Examiners.*